(12) United States Patent
Devonport et al.

(10) Patent No.: US 6,406,058 B1
(45) Date of Patent: Jun. 18, 2002

(54) INFLATABLE SAFETY RESTRAINT SYSTEM

(75) Inventors: Alex Devonport; Mark J. Butera, both of Glendale, AZ (US)

(73) Assignee: Universal Propulsion Co., Inc., Phoenix, AZ (US)

( * ) Notice: Subject to any disclaimer, the term of this patent is extended or adjusted under 35 U.S.C. 154(b) by 0 days.

(21) Appl. No.: 09/444,731

(22) Filed: Nov. 18, 1999

(51) Int. Cl.⁷ .............................................. B60R 21/18
(52) U.S. Cl. ...................................... 280/733; 280/807
(58) Field of Search ........................ 180/268; 280/730.1, 280/733, 801.1, 805, 807; 297/468, 469, 470

(56) References Cited

U.S. PATENT DOCUMENTS

| | | | | |
|---|---|---|---|---|
| 3,682,498 A | * | 8/1972 | Rutzki | 280/733 |
| 4,023,427 A | * | 5/1977 | Beier | 180/268 |
| 4,611,854 A | * | 9/1986 | Pfeiffer | 280/801.1 |
| 5,340,152 A | * | 8/1994 | Fohl | 280/805 |
| 5,851,055 A | | 12/1998 | Lewis | |
| 6,102,439 A | * | 8/2000 | Smithson et al. | 280/805 |
| 6,109,647 A | * | 8/2000 | Akaba et al. | 280/733 |
| 6,116,637 A | * | 9/2000 | Takeuchi et al. | 280/733 |
| 6,126,194 A | * | 10/2000 | Yaniv | 280/733 |
| 6,142,511 A | * | 11/2000 | Lewis | 280/733 |
| 6,142,512 A | * | 11/2000 | Suyama | 280/733 |
| 6,145,873 A | * | 11/2000 | Takeuchi | 280/733 |
| 6,168,195 B1 | * | 1/2001 | Okazaki et al. | 280/733 |
| 6,170,863 B1 | * | 1/2001 | Takeuchi et al. | 280/733 |

* cited by examiner

Primary Examiner—J. J. Swann
Assistant Examiner—Christopher Bottorff
(74) Attorney, Agent, or Firm—Jerry J. Holden

(57) ABSTRACT

A method and apparatus for providing a stationary plenum to receive hot inflation gases from a vehicle safety system gas inflator and for such plenum to supply such gases to an inflatable member which protects a vehicle occupant.

18 Claims, 3 Drawing Sheets

INFLATABLE SAFETY RESTRAINT SYSTEM

BACKGROUND OF THE INVENTION

Prior belt systems have included inflators which are connected directly to the inflator member, such as a belt or belt portion to be inflated (U.S. Pat. No. 5,851,055). The effect of such a direct connection is to subject the fabric of the inflatable member to hot rapidly removing gases. Since such gas discharge causes erosion of the outer layers of the fabric, fabrics of substantial thickness are required Further. inflatable member systems in which the inflator is movable with the inflator member have the drawback that the system including the inflator has an increased weight.

SUMMARY OF THE INVENTION

Broadly, the present invention comprises a method and apparatus for receiving gases from an inflator and thereafter briefly storing and supplying such gases to an inflatable member occupant-protection system. Since hot gases of high velocity are discharged into a plenum enclosure before reaching the inflatable member, gas heat and speed dissipation occurs before the gases enter the inflatable member. The plenum member is made of a material resistant to hot gas erosion.

Inflatable members are normally constructed of fabric. In the present invention the inflatable member is not subjected to direct assault of the hot gases, the inflatable member may be constructed of thinner, lighter and more comfortable fabrics. Further, in the practice of the present invention the inflator and its gas supply are stationary thus reducing the weight of the movable portions of the system.

The plenum enclosure also serves as a reciprocal guide for inflatable member end portion which end portion in turn may be attached to the web belt section. Gases residing in the plenum are forthwith supplied to the inflatable member.

DESCRIPTION OF THE PREFERRED EMBODIMENT

Figure 1:
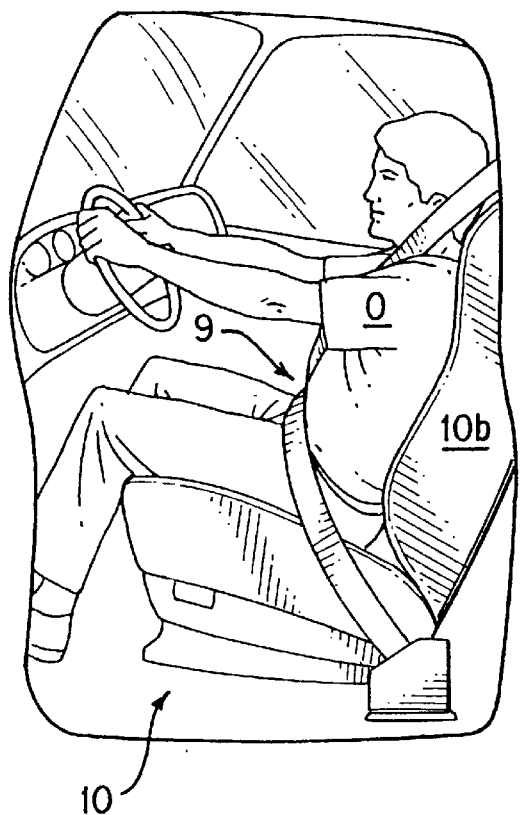
FIG. 1 is a left side elevational view of a front seat driver occupant buckled up with a lap and torso inflatable seat belt.
Figure 3:
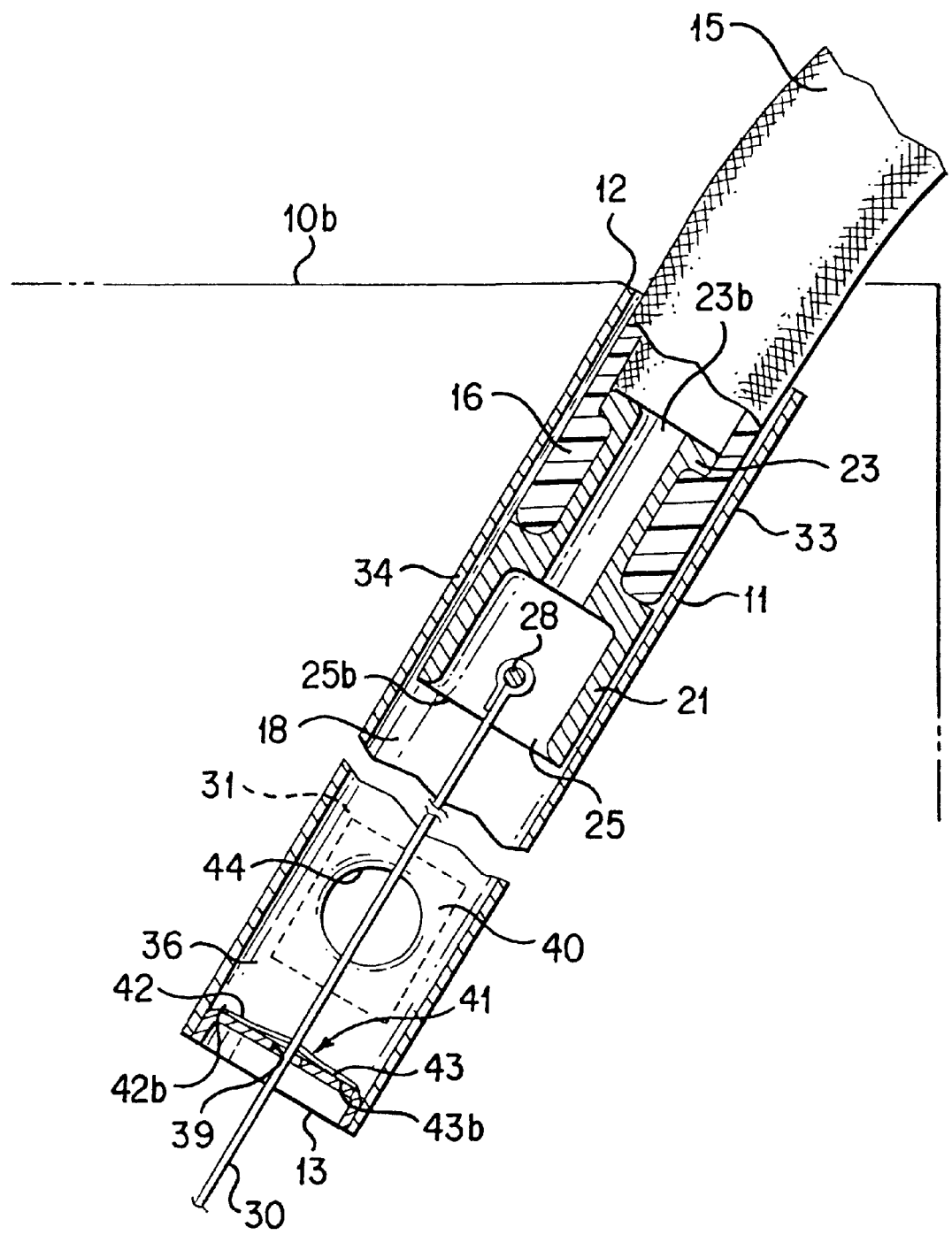
FIG. 3 is a perspective view, partially in section along line 3—3 of FIG. 4, of stationery plenum fixed to the back of a vehicle seat.

Turning first to FIG. 1, driver occupant 0 is positioned on seat 10 buckled up with a three-point belt 9. Further turning to FIGS. 1 and 3, stationary rectangular enclosure unit 11, fixed in the seat back 10b of seat 10, has upper open end 12 through which belt 15 emerges and lower slotted end 13 positioned in the lower area of seat back 10b. Within enclosure unit 11 is inflatable belt 15 having end 16 attached to reciprocal member 21 having upper head portion 23 attached to inflatable belt 15 and lower head portion 25 having cross bar 28 for holding web belt section 30. Inflator 31 (shown in dashed lines in FIG. 3) supplies gas to enclosure unit 11 through supply tube 44. The volume within enclosure unit 11 between end 13 and the entrance to the interior of member 21 provides a plenum gas storage volume 18. Gas storage area 18 may alternatively include in addition the interior 25b of head portion 25 and the interior 23b of head portion 23. Plenum 18 serves to receive hot gases without being eroded or otherwise substantially damaged. Plenum 18 also serves to equalize gas pressure and to supply gases to belt 15 or other member to be inflated. Enclosure unit 11 and reciprocal member 21 are made of metal or other material so that it can withstand the hot gas stream flowing from the gas source. Reciprocal member 21 includes an opening to permit flow of gases from plenum 18 to inflatable belt portion.

Figure 4:
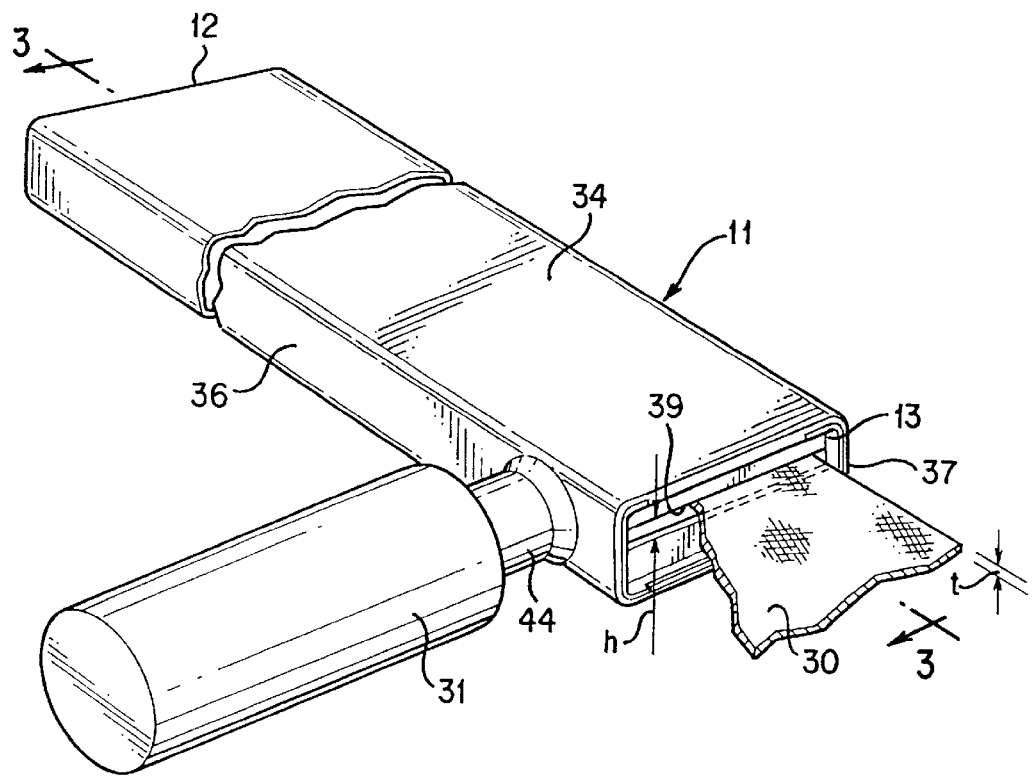
FIG. 4 is an enlarged partial perspective view of the plenum and attached inflator.
Figure 5:
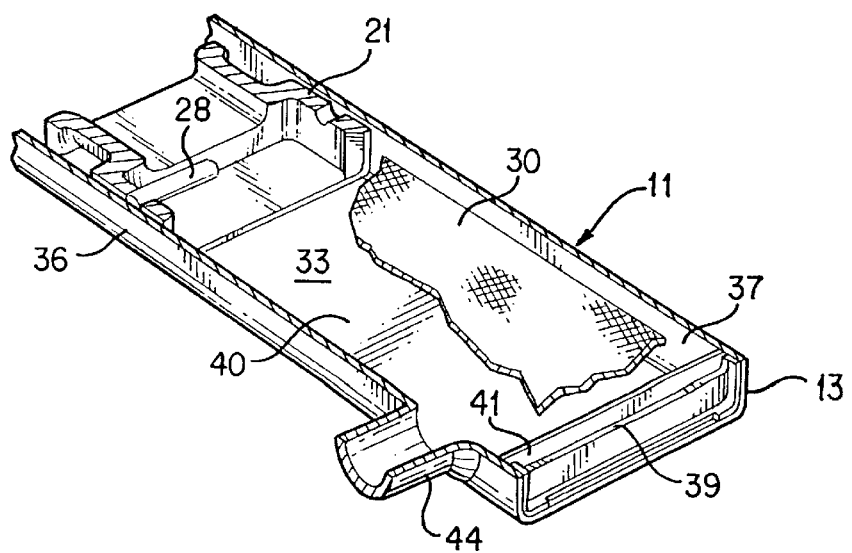
FIG. 5 is a perspective view of the lower half of the plenum.

Turning to FIGS. 4 and 5, enclosure unit 11 includes bottom wall 33, top wall 34 and side walls 36, 37. The lower end 13 of unit 11 has slot 39 in it through which web belt 30 passes. Slot 39 has a height (h). Web 30 has a thickness (t) which thickness is one-third to one-half the height (h). Reed valve 41 serves to seal the portion of slot 39 not occupied by web 30. Reed valve 41 includes flaps 42, 43 mounted about hinges 42b 43b for rotation against web 30 (see also FIG. 3). When a collision occurs and pressure builds in enclosure unit 11, the forces which are exerted against flaps 42, 43 urge the flaps against the web 30 providing a gas seal preventing gas loss. By reducing gas loss, more gases at higher pressure flow into the inflatable member. As the pressure increases, the seal is improved.

When there is no pressure in unit 11, web 30 reciprocates through slot 39 with little or no interferences or friction. Reed valve flaps 42, 43 are operated by pressure in plenum to prevent or to reduce gas loss. The seal formed allows some leakage or bleeding and when, as pressure decreases, a pre-determined pressure is reached the valve flaps 42, 43 open. Gate valves or other valve mechanisms may be used. Such mechanisms may employ means to cause the valve to open at a fixed or other time after inflation to permit the inflated belt or other member to deflate.

Figure 2:
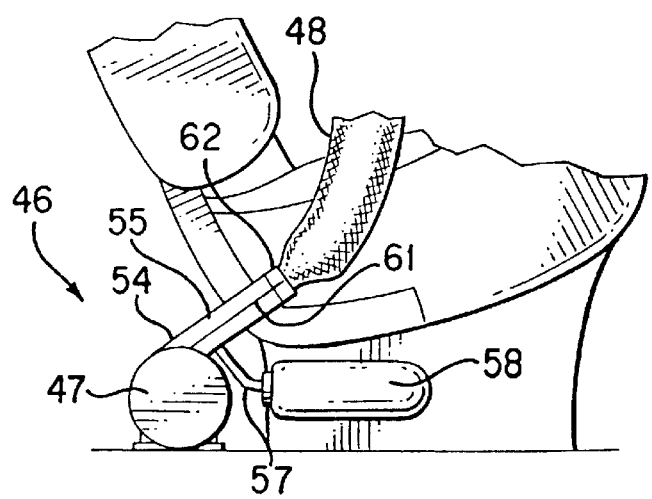
FIG. 2 is a partial right side elevational view, partially in section, of the front driver seat, lap belt reel and gas plenum arrangement for serving the lap portion of the belt system.

In FIG. 2 another embodiment of the invention is shown in which a plenum and inflator unit 46 is positioned between a seat-side retractor 47 to serve a lap belt portion 48 of the three point safety belt 9. Also shown is plenum enclosure 54, plenum 55, gas supply tube 57 and inflator 58. Further there is shown belt web 61 and lap belt portion connector slide 62 which reciprocates in enclosure 54. Lap belt portion 48 is shown in its inflated state. When the vehicle rapidly decelerates, inflator 58 supplies enclosure 54 with gas which flows into belt portion 48. The plenum and inflator units of the present invention may be located at any appropriate vehicle location to serve a belt portion or bag system.

In operation of the belt system of the present invention, the inflatable belt portion is reciprocated in the embodiment enclosures as the belt system is buckled up and unbuckled. Such reciprocation is limited by stops not shown. When pay-out of an inflatable belt portion is arrested, other portions of the belt system supply as needed belting for buckling up to protect occupants of varying sizes. The inflatable portion is inflated only when the belt system is in the buckled-up mode. When the belt system is buckled up to protect a larger occupant the plenum differs in size as compared to when the belt system is buckled up to protect a small occupant. The gas-generating capacity of the inflator should be sufficient to provide sufficient quantities of gases to occupy both the plenum and the inflatable belt portions.

Turning now to the operation of the first embodiment (FIGS. 3–5), when the occupant buckles up belt 15 attached head portion 25 and web 30 move upwardly through unit 11 and moves in the opposite direction when the occupant unbuckles. In case of rapid deceleration of the vehicle, a sensor (not shown) activates inflator 31 causing gases to flow through opening 44 into plenum 40. As pressure builds in plenum 40 flaps 42,43 of reed valve 41 rotate against the surfaces of web 30 to prevent any substantial escape of gases past web 30. Gases flow from plenum 40 through interior 25b of head 25 into belt 15 causing belt 15 to inflate. Since plenum 40 is made of metal or other suitable material, the force of flowing hot gases is absorbed by plenum 40 prior to being fed into and against fabric belt 15. During the gases change of direction as they enter plenum 40 and during their flow in the plenum 40 and in head portion 25, the heat and force of the gases has dissipated.

The second embodiment of the invention operates as follows (FIG. 2). The plenum and inflator units 46 are mounted on the side of seat 45 near the vehicle floor. During buckling and unbuckling of belt arrangement 9 (FIG. 1), connector slide 62 and web 61 reciprocate. Upon rapid vehicle deceleration, inflator 58 is activated to generate and discharge hot gases into the plenum 55 which is the interior volume of enclosure 54. Gases thereafter flow into belt portion 48 to affect inflation.

We claim:

1. A belt restraint system for protecting an occupant of a seat mounted in a vehicle, comprising:
   an enclosure associated with the seat and having a plenum;
   an inflator in fluid communication with the enclosure for supplying gas to the plenum; and
   an inflatable member comprising:
      a gas receiving portion attached thereto, wherein the gas receiving portion is slideably mounted within the enclosure and has a first opening in fluid communication with the plenum and a second opening in fluid communication with the inflatable member; and
      a belt portion extending through a first end of the enclosure toward the occupant.

2. The system of claim 1 further comprising a belt web connected to the gas receiving portion.

3. The system of claim 2, wherein the belt web extends through the second end of the enclosure.

4. The system of claim 3, farther comprising a valve that reduces gas loss through the second end of the enclosure when the enclosure is pressurized.

5. The system of claim 4, wherein the valve is pressure operated.

6. The system of claim 5, wherein the valve is a reed valve.

7. The system of claim 2 in which the belt web is fed from a retractor.

8. The system of claim 2 in which the belt web is fed from a retractor.

9. The system of claim 2, wherein a crossbar connects the belt web and gas receiving portion.

10. The system of claim 1, wherein a sensor activates the inflator upon deceleration.

11. A belt restraint system for protecting an occupant of a seat mounted in a vehicle comprising:
   a stationary enclosure associated with the seat and having a plenum; an inflator in fluid communication with the enclosure for supplying gas to the plenum; an inflatable member having a gas receiving portion attached thereto, wherein the gas receiving portion slideably mounted within the stationary enclosure and has a first opening in fluid communication with the plenum and a second opening in fluid communication with the inflatable member; and
   a belt web connected to the gas receiving portion and extending towards a second end of the enclosure.

12. The system of claim 11 in which the belt web is fed from a retractor.

13. The system of claim 11, wherein the belt web extends through the second end of the enclosure.

14. The system of claim 13, further comprising a valve that reduces gas loss through the second end of the enclosure when the enclosure is pressurized.

15. The system of claim 14, wherein the valve is pressure operated.

16. The system of claim 15, wherein the valve is a reed valve.

17. The system of claim 11, wherein a sensor activates the inflator upon deceleration.

18. The system of claim 11, wherein a crossbar connects the belt web and gas receiving portion.

* * * * *